United States Patent
Yamamoto et al.

(10) Patent No.: US 6,980,235 B1
(45) Date of Patent: Dec. 27, 2005

(54) DIGITAL CAMERA UNIFIED WITH PRINTER

(75) Inventors: Koji Yamamoto, Kawanishi (JP);
Tohru Murakami, Okazaki (JP); Toru Ishi, Hirakata (JP); Akira Fukuda, Osaka (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 1004 days.

(21) Appl. No.: 09/631,622

(22) Filed: Aug. 4, 2000

(30) Foreign Application Priority Data

Aug. 6, 1999 (JP) .......................................... 11-223760

(51) Int. Cl.⁷ .............................................. H04N 5/225
(52) U.S. Cl. ..................... 348/207.2; 348/375; 348/376
(58) Field of Search ........................ 348/207.99, 207.2, 348/371, 372, 374, 375, 376; 347/2, 109, 186, 85, 87, 88; 358/906, 909.1

(56) References Cited

U.S. PATENT DOCUMENTS

| | | | |
|---|---|---|---|
| 5,822,637 A | | 10/1998 | Stephenson |
| 5,835,136 A | | 11/1998 | Watanabe et al. |
| 5,847,836 A | * | 12/1998 | Suzuki ....................... 348/372 |
| 5,886,713 A | * | 3/1999 | Okada et al. ................. 347/14 |
| 6,149,256 A | * | 11/2000 | McIntyre et al. .............. 347/2 |
| 6,229,565 B1 | * | 5/2001 | Bobry .................... 348/207.99 |
| 6,238,111 B1 | * | 5/2001 | Silverbrook ................ 347/109 |
| 6,577,338 B1 | * | 6/2003 | Tanaka et al. ........... 348/207.2 |
| 6,587,140 B2 | * | 7/2003 | No ........................... 348/207.2 |
| 6,618,078 B1 | * | 9/2003 | Budrys .................. 348/207.99 |

FOREIGN PATENT DOCUMENTS

| | | |
|---|---|---|
| JP | 8-197724 | 8/1996 |
| JP | 11-254676 | 9/1999 |

* cited by examiner

*Primary Examiner*—Aung Moe
*Assistant Examiner*—Luong T. Nguyen
(74) *Attorney, Agent, or Firm*—McDermott Will & Emery LLP

(57) ABSTRACT

A digital-type camera having a printing mechanism which assures a high quality of prints in an environment with a low temperature. The digital-type camera has an arrangement in which an ink cartridge, for storing ink fed to a printer head of a printing part, is installed on a rear surface of a substrate on a front surface of which a CCD of a heat-generating component is installed. Heat generated from the CCD is conducted to the ink cartridge via the substrate, so that the ink stored inside the ink cartridge is prevented from dropping down in temperature, and so that the temperature of the ink is kept within a thermal region within which its printing operation is guaranteed.

20 Claims, 11 Drawing Sheets

DIGITAL CAMERA UNIFIED WITH PRINTER

This application is based upon application No. 11-223760 filed in Japan, the contents of which are hereby incorporated by reference.

BACKGROUND OF THE INVENTION

1. Field of the Invention

The present invention relates to a digital camera unified with a printer.

2. Description of the Related Arts

Generally, the viscosity of ink employed for an ink jet printer, becomes higher, as the temperature becomes lower. For example, as shown in FIG. 17, the viscosity thereof of 2 to 3 cp at normal temperature, becomes 4 to 10 cp at low temperature. Of all the printing characteristics of an ink jet head, a frequency characteristic (i.e. responsive nature to frequency) having a close relation to the printing speed, becomes worse or degraded, if the viscosity of the ink becomes high, as shown in FIG. 18. That is, it has been known that if the temperature of ink becomes lower, the fluidity of the ink also becomes lower. As a result, the printing quality becomes worse or degraded, leading to blurs of what is/are printed on paper, and/or leading to shifts in colors, etc.

On the other hand, there has been proposed a digital camera unified with a printer (i.e. digital camera having the printer). Such a digital camera may be employed by a user under various conditions from a viewpoint of the characteristics as a product. For example, the digital camera may be carried from place to place by the user, and it may be employed to take photographs and/or to print them out in various environments, or places, having different conditions in temperature.

In case that the ink jet printer is employed as a printer with which the digital camera is unified, the printing operation, therefore, may be carried out in such various environments with low temperature. This may, however, result in degradation of the printing quality, as apparent from the above explanation about the properties of ink.

SUMMARY OF THE INVENTION

Therefore, it is an object of the present invention to provide a digital camera unified with a printer, which realizes a good (or high) quality of print(s), even if the digital camera is employed in the environment with low temperature.

In accomplishing this and other objects of the present invention, according to one aspect thereof, there is provided a digital camera comprising: a member which generates heat at time of executing a photographing operation; a printing part for printing an image on a basis of data upon the image which is taken at time of executing the photographing operation; and a supplier for supplying an ink to the printing part, wherein the supplier adjoins the member.

In the mechanism, the supplier is arranged near the member which generates the heat. Therefore, the heat is transmitted from the member to the supplier, and the temperature of the ink is prevented from dropping down. In other words, with the mechanism, increase in viscosity of the ink due to the temperature's dropping down is effectively blocked; consequently, it is possible to print the image, on a sheet of paper for example, by the printing part with a proper viscosity of the ink. Hence, even if the digital camera is employed in any environment with low temperature, prints with a good (or high) quality are surely realized.

In accomplishing the above object of the present invention, according to another aspect thereof, there is provided a digital camera comprising: a first member which generates heat at time of executing a photographing operation; a printing part for printing an image on a basis of data upon the image which is taken at time of executing the photographing operation; a supplier for supplying an ink to the printing part; and a second member for conducting the heat from the first member to the supplier.

In the mechanism, there is provided the second member for conducting the heat from the first member to the supplier. Therefore, the heat is effectively transmitted, or conducted, from the first member to the supplier, no matter how far the first member and the supplier are away from each other; and the temperature of the ink is prevented from dropping down. In other words, with the mechanism, increase in viscosity of the ink due to the temperature's dropping down is effectively blocked; consequently, it is possible to print the image, on a sheet of paper for example, by the printing part with a proper viscosity of the ink. Hence, even if the digital camera is employed in any environment with low temperature, prints with a good (or high) quality are surely realized.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE PREFERRED EMBODIMENTS

Figure 1:
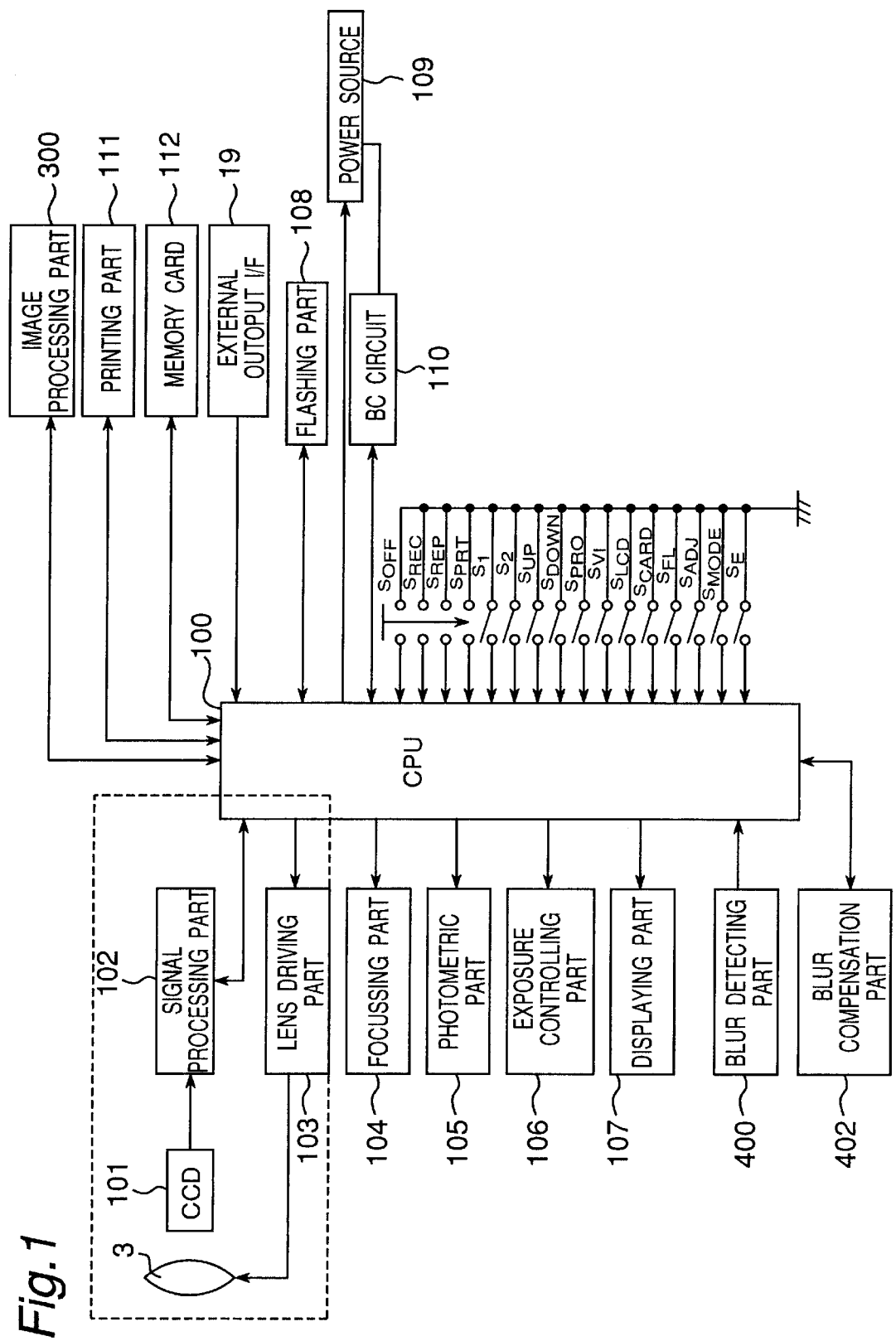
FIG. 1 is a block diagram of a digital camera unified with a printer according to a first embodiment of the present invention.

Before the description of the preferred embodiments of the present invention proceeds, it is to be noted that like parts, or corresponding parts, are designated by like reference numerals throughout the accompanying drawings.

Referring to FIG. 1 through 16, a description is made below on a digital camera unified with a printer according to each of a first embodiment and a second embodiment of the present invention.

First, referring to FIGS. 1 through 6, the description is made below on the digital camera unified with the printer according to the first embodiment thereof.

Figure 2:
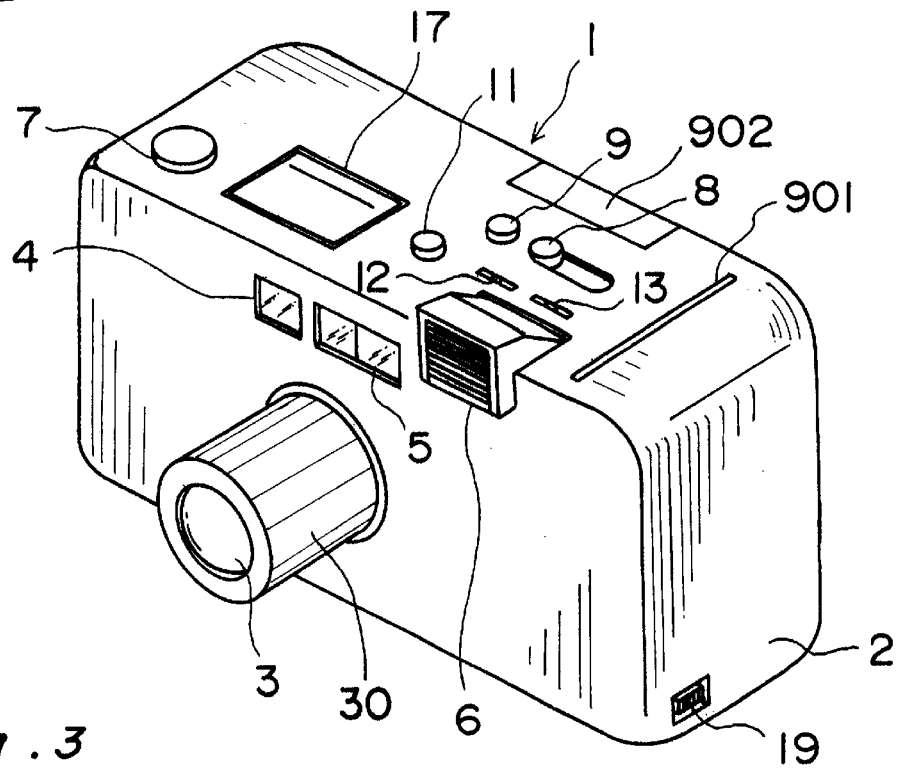
FIG. 2 is an aslant front view of the digital camera of FIG. 1.
Figure 3:
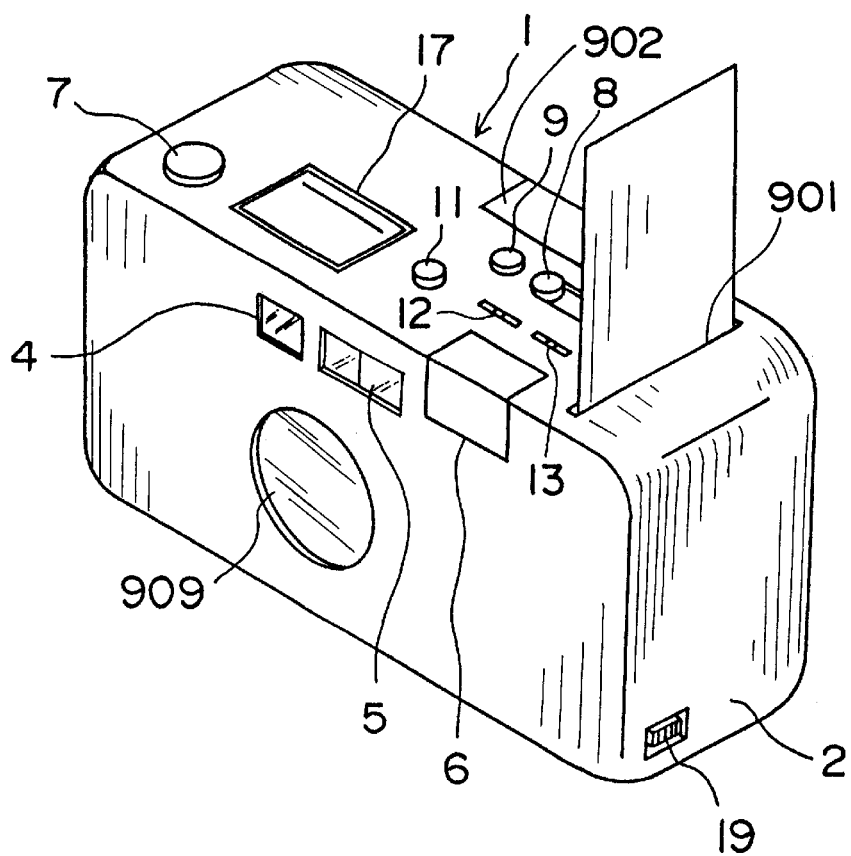
FIG. 3 is an aslant front view similar to FIG. 2.
Figure 4:
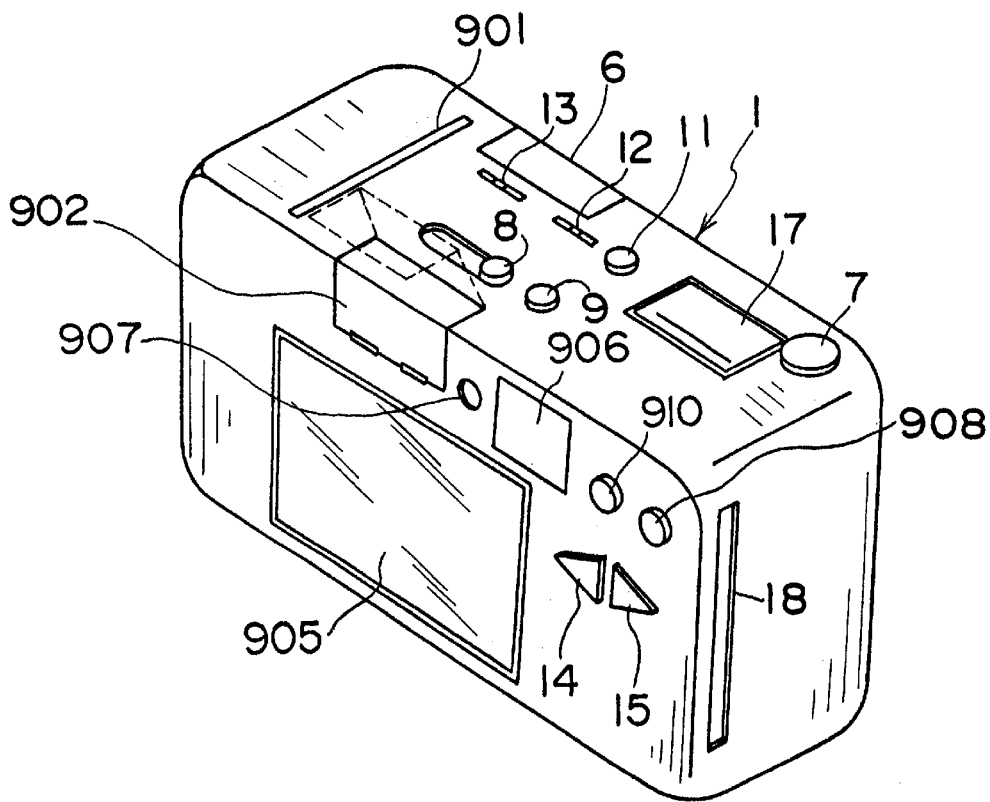
FIG. 4 is an aslant rear view of the digital camera of FIG. 2.
Figure 5:
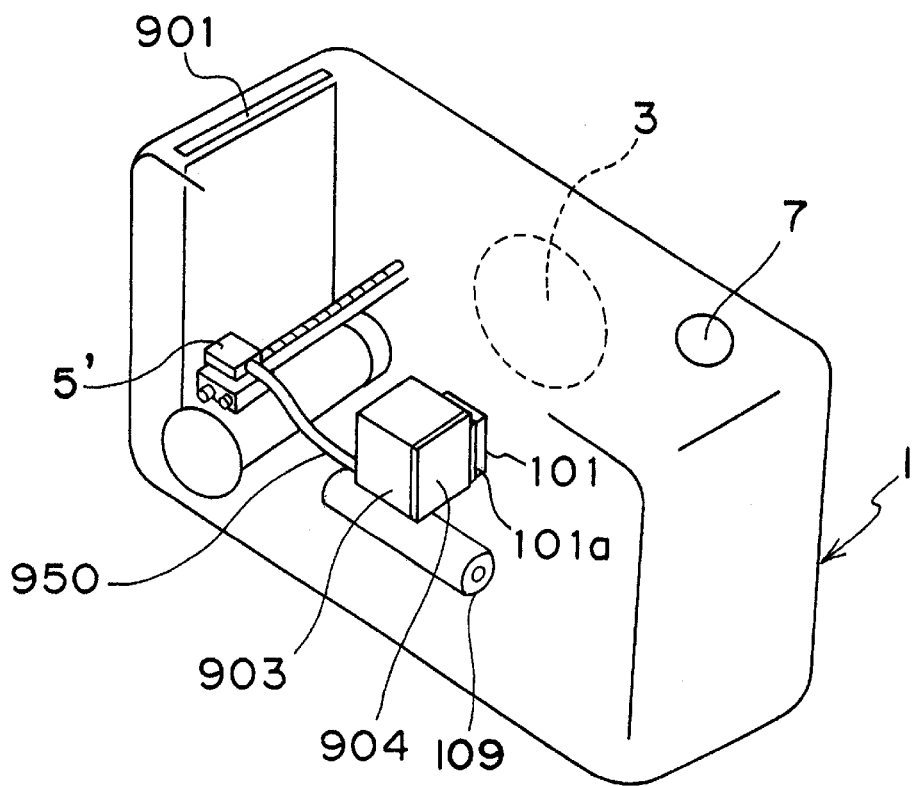
FIG. 5 is a perspective rear view of the digital camera of FIG. 2.

FIG. 2 is an aslant front view of the digital camera of the first embodiment; FIG. 3 is a view similar to FIG. 2; FIG. 4 is an aslant rear view of the digital camera of FIG. 2; and FIG. 5 is an aslant rear perspective view of the digital camera of FIG. 2.

Those figures show a camera body 1 and a printer unit part 2 which is included in the camera body 1. The printer unit part 2 has a built-in mechanism including a plurality of components which are necessary to execute a printing operation of the digital camera.

On a front side of the camera body 1, there are provided a photographing lens 3, a viewfinder window 4, an AF unit 5 for auto-focus detection (hereinafter, also simply referred to as "AF"), a flash device 6 which can pop up from the camera body 1, and a lens barrier 909.

The photographing lens 3 is supported by a lens barrel 30, and the lens barrel 30 can be projected (or protruded) and retracted relative to the camera body 1. When the lens barrel 30 is retracted inside the camera body 1, the lens barrier 909 is closed to cover the photographing lens 3.

On the front side of the camera body 1, there are also provided various operational members 7, 8, 9, 11, 12, 13 and a display device (or indicator) 17.

More specifically, the reference numeral 7 points to a shutter start/print start button. This shutter start/print start button 7 is employed to carry out not only the photographing operation, but also the printing operation of the digital camera.

That is, if the shutter start/print start button 7 is employed as a button to carry out the photographing operation, when the button 7 is half-pressed down, a switch $S_1$ is turned on to prepare taking a photograph. And when the button 7 is full-pressed down, a switch $S_2$ is turned on to start taking the photograph.

On the other hand, if the shutter start/print start button 7 is employed as a button to carry out the printing operation, when the button 7 is pressed down, the printing operation is started.

Meanwhile, the reference numeral 8 points to a mode changeover switch by which one of modes, which are "OFF" mode, "RECORD" mode, "REPRODUCTION" mode and "PRINT" mode, is selected.

The reference numeral 9 points to a protection switch for preventing any image, once recorded or stored, from being deleted (or erased) due to a careless operation by the user.

The reference numeral 11 points to a flashing mode changeover switch by which one of modes, which are "no flash light emitted from the flash device 6" mode (or "OFF" mode), "flash light automatically emitted therefrom" mode (or "AUTO" mode) and "flash light forcibly emitted therefrom" mode (or "ON" mode), is selected.

The reference numeral 12 points to a date setting switch for setting a particular date on which any photograph is taken by the digital camera.

The reference numeral 13 points to a photographing mode changeover switch. Every time this switch 13 is turned on, one of modes, which are "SINGLE PHOTOGRAPHY" mode, "SELF" mode and "SERIES PHOTOGRAPHY" mode, is selected one after another in this order.

The display device (or indicator) 17 is composed of an LCD, for example, and it displays the aforementioned date, the frame number employed at time of photographing and printing, and other contents of modes thus set.

On a top side of the camera body 1, there is provided a printed sheet discharging outlet (or printed sheet discharging slot) 901, through which any sheet printed by the printer unit part 2 is discharged, as shown in FIG. 3.

The reference numeral 902 points to a slider which can be opened and closed manually, as indicated by a dotted line in FIG. 4. The photographer, or user, of the digital camera, can replace an ink cartridge 903 with another, by opening the slider 902. As shown in FIG. 5, the ink cartridge 903 is fixed with a lid 904 inside the camera body 1. If this lid 904 is removed sideways, the ink cartridge 903 can be removed upwards from the camera body 1 by fingers. By the way, a predetermined number of sheets of paper to be printed, can be loaded from a bottom side of the camera body 1. The printing part 111 (see FIG. 6), of the printer unit part 2 of the camera body 1, will be described in detail later.

As shown in FIG. 5, the ink cartridge 903 is arranged at a central part of the camera body 1; and a printer head 5' is arranged on a side of the camera body 1. In this arrangement, the ink is supplied from the ink cartridge 903 to the printer head 5' through a supply tube 950.

In this first embodiment, the cartridge 903 is removably mounted on a rear surface of a substrate 101a; and a solid-state image taking element (hereinafter, also referred to as "CCD") 101 is mounted on a front surface of the substrate 101a. In this arrangement, heat, which is generated by the CCD 101, is transmitted to the ink cartridge 903 through the substrate 101a. Namely, according to this arrangement, a drop down of temperature of ink stored inside the ink cartridge 903 is effectively prevented in an environment with a low temperature. As a result, it is possible to maintain, or keep, the temperature of ink therein within a range of temperature within which the printing operation is assured and guaranteed, and therefore possible to realize a good (or high) quality of prints even in such an environment with the low temperature.

Also, as shown in FIG. 5, there is provided a battery 109, as its power source, below the ink cartridge 903. In this arrangement, heat, which is generated by the battery 109, is also transmitted to the ink cartridge 903.

As shown in FIG. 4, on one of sides of the camera body 1, there is provided a memory card insertion slot 18. On the other hand, as shown in FIGS. 2 and 3, on the other of sides of the camera body 1, there is provided an output terminal 19 for PC (i.e. output terminal for personal computer, or PC-use output terminal). The memory card insertion slot 18 is in a form of a slit, and it is employed for allowing an external recording medium (hereinafter, also referred to as "memory card") to be inserted inside the camera body 1. The PC-use output terminal 19 is provided on an appropriate location of the other of sides of the camera body 1. This terminal 19 is a terminal to provide connection to the personal computer (i.e. PC).

As shown in FIG. 4, on a rear surface of the camera body 1, there are provided a plurality of buttons 14, 15, 908 and 910, a viewfinder window 906, a focus indication lamp 907, and an image display LCD 905 (or LCD for displaying images). The image display LCD 905 is composed of a liquid crystal display and a back light which illuminates the liquid crystal display from behind. In this arrangement, heat, which is generated by the back light, is also transmitted to the ink cartridge 903, directly or through a supporting substrate.

More specifically, the reference numerals 14 and 15 point to a pair of zoom buttons, respectively. When the zoom button 14 is pushed down (or depressed), the photographing lens 3 is driven toward a wide angle side. Meanwhile, when the zoom button 15 is pushed down (or depressed), the photographing lens 3 is driven toward a telephoto side.

These zoom buttons 14 and 15 also have another function. Namely, these buttons 14 and 15 can be employed, as access buttons, to retrieve (or call) image data which is stored on a memory card 112 described later. That is, every time the user makes an access to the access button 14, the images which have been stored are fed in a forward direction. Meanwhile, every time the user makes an access to the access button 15, the images which have been stored are fed in a backward direction.

The button 908 is an LCD switch for turning on and off the image display LCD 905.

The button 910 is a manual blur compensation switch for compensating any drawback which may be caused by a shaking, or movement, of the camera body 1 when the user handles the digital camera, and the button 910 is employed to switch on and off a mechanism to execute its compensating operation.

The user can view an image of any object to be photographed through the viewfinder window 906 when he/she takes a photograph thereof. The image display LCD 905 displays any monitoring image at time of taking the photograph; it displays any image selected at time of reproducing images; and it displays any image recorded (or stored) at time of printing.

When the shutter start/print start button 7 is half-depressed in (namely, when the switch $S_1$ is turned on), and when the preparatory operation to take the photograph is completed, the focus indication lamp 907 is lit on. On the other hand, when the shutter start/print start button 7 is half-depressed in (namely, when the switch $S_1$ is turned on), and when it is not possible to execute the operation to take the photograph because there is too short up to the object to focus the image thereof and/or because a charging operation is being carried out for the flash device 6, the focus indication lamp 907 is lit on and off (i.e. blinked) to make the user know the situation not possible to take the photograph.

The focus indication lamp 907 is also employed in the printing mode. Namely, when the printing mode is set, the focus indication lamp 907 is lit on. On the other hand, when there occurs any error at time of the printing mode, the focus indication lamp 907 is lit on and off.

Next, referring to a block diagram of FIG. 1, it is explained about a controlling system of the digital camera.

A reference numeral 100 points to a system controller (hereinafter, also referred to as "CPU") for controlling an overall operation, including the printing operation, of the digital camera. An object image (i.e. an image of the object to be taken or photographed) formed through the photographing lens 3, is captured on the solid-state image taking element (i.e. CCD) 101, and an output image signal output from the CCD 101 is processed in a signal processing part 102. This signal processing part 102 will be described in detail later.

The photographing lens 3 is controlled to be driven, by a lens driving part 103, so as to focus the object, on the basis of a result of its focusing operation.

A reference number 104 points to a focusing part where a distance up to the object is calculated, or sought for, by making use of a phase differentiation detecting method, or system, for example. On the basis of the focusing data, the amount of driving of the photographing lens 3 by the lens driving part 103 is calculated. By the way, the lens driving part 103 also makes the lens barrel 30, holding the photographing lens 3, project and retract, and it makes the lens barrier 909 to open and close.

A reference numeral 105 points to a photometric part for measuring the luminance, or brightness, of the object to be photographed. The photometric part outputs the photometric data to the CPU 100.

A reference numeral 106 points to an exposure controlling part 106 for controlling to execute an exposing operation of the digital camera, by receiving data on its focussing, data on its exposure time (shutter speed) Tv which is calculated on the basis of the result of photometry, and data on its value (or amount) Av of aperture.

A reference numeral 107 points to a displaying part. The displaying part 107 is composed of the display device 17, a driving mechanism to drive the display device 17, the LCD 905, and a driving mechanism to drive the LCD 905.

A reference numeral 400 points to a blur detecting part 400 for detecting an amount of shake, or movement, of the camera body 1, the shake or movement of which is caused when the user handles the digital camera at time of taking the photograph. The blur detecting part 400 detects the amount of shake, or movement, thereof, by an acceleration sensor which is provided inside the camera body 1.

A reference numeral 402 points to a blur compensation part 402 for compensating the shake, or movement, of the camera body 1, on the basis of the results from the blur detecting part 400. More specifically, the blur compensation part 402 has a compensatory optical member which is provided in a photographing optical system, and the compensatory optical member is driven in a direction perpendicular to an optical axis of the photographing optical system in order to compensate the shake, or movement, thereof.

A reference numeral 300 points to an image processing part 300. The image processing part 300 processes an image signal, and it executes the image processing operation in order to output the processed data to the image display LCD 905 and to an printing part 111 (refer to FIG. 1) if necessary.

A reference numeral 108 points to a flashing part. The flashing part 108 is controlled by a signal, output from the CPU 100, to control boosting the voltage for charging electricity and to control emitting a flash light. That is, the flashing part 108 functions to make the flash device 6 emit the flash light. Also, the flashing part 108 moves the flash device 6 between a position in which the flash device 6 is popped up (i.e. projected) and a position in which the flash device 6 is retracted inside the camera body 1, in compliance with a control signal output from the CPU 100.

A reference numeral 109 points to the power source (i.e. battery) for supplying a predetermined high voltage to the CCD 101, and for supplying a predetermined level of voltage to other electric circuits including the CPU 100.

A reference numeral 110 points to a battery check circuit 110. The battery check circuit 110 is electrically connected to the battery of the power source 109 in order to detect the capacity thereof. The result of the detection thereof is outputted to the CPU 100.

The printing part 111 is driven under the control of the CPU 100 so as to print out the image signal on a recording sheet of paper (its explanation will be made in detail later).

A reference numeral 112 points to the memory card able to be inserted into the memory card insertion slot 18 (refer to FIG. 4). This is a recording medium which is able to record, or to store, a plurality of images, and which is composed of SRAM, for example.

A reference numeral 19 points to an external output I/F. The external output I/F 19 corresponds to the PC-use output terminal 19 shown in FIG. 2.

Next, referring to FIG. 1 etc., it is explained about various types of switches $S_{OFF}$ through $S_{MODE}$.

$S_{OFF}$: This switch is turned on when the mode changeover switch 8 is turned into a position of "OFF", and it makes the digital camera inoperative.

$S_{REC}$: This switch is turned on when the mode changeover switch 8 is turned into a position of "RECORDING", and it allows the digital camera to take a photograph.

$S_{REP}$: This switch is turned on when the mode changeover switch 8 is turned into a position of "REPRODUCTION", and it allows data to be transmitted to the PC or the like.

$S_{PRT}$: This switch is turned on when the mode changeover switch 8 is turned into a position of "PRINT", and it allows the recorded image to be printed out.

$S_1$: This switch is turned on when the shutter start/print start button 7 is half-depressed, as a first depressing step, at time of photographing, and it instructs the digital camera to prepare executing the photographing operation.

$S_2$: This switch is turned on when the shutter start/print start button 7 is full-depressed, as a second depressing step, and it instructs the digital camera to start executing the exposing operation or to execute the printing operation.

$S_{UP}$: This switch is turned on every time the zoom button (or access button) 15 is depressed in, and it executes the operation to reproduce the recorded images in a state in which the recorded images are fed forwards.

$S_{DOWN}$: This switch is turned on every time the zoom button (or access button) 14 is depressed in, and it executes the operation to reproduce the recorded images in a state in which the recorded images are fed backwards.

$S_{PRO}$: This switch, alternately, protects the recorded images (or stored images) and releases the protection of the recorded images (or stored images) every time the protection switch 9 is depressed in.

$S_{VI}$: This switch detects whether the blur compensation switch 910 is turned on or off.

$S_{LCD}$: This switch detects whether the LCD switch 908 is turned on or off.

$S_{CARD}$: This switch is turned on when the memory card 112 is inserted into the camera body 1.

$S_{FL}$: This switch is turned on every time the flashing mode changeover switch 11 is depressed in, and it executes a cyclic changeover amongst the mode of "non-emission of flash light", the mode of "automatic emission thereof", and the mode of "forcible emission thereof".

$S_{ADJ}$: This switch corresponds to the date setting switch 12.

$S_{MODE}$: This switch is turned on every time the photographing mode changeover switch 13 is depressed in, and it executes cyclic changeover amongst the mode of "SINGLE PHOTOGRAPHY", the mode of "SELF PHOTOGRAPHY", and the mode of "SERIES PHOTOGRAPHY".

$S_E$: This switch detects whether an erasing switch is depressed in.

Figure 6:
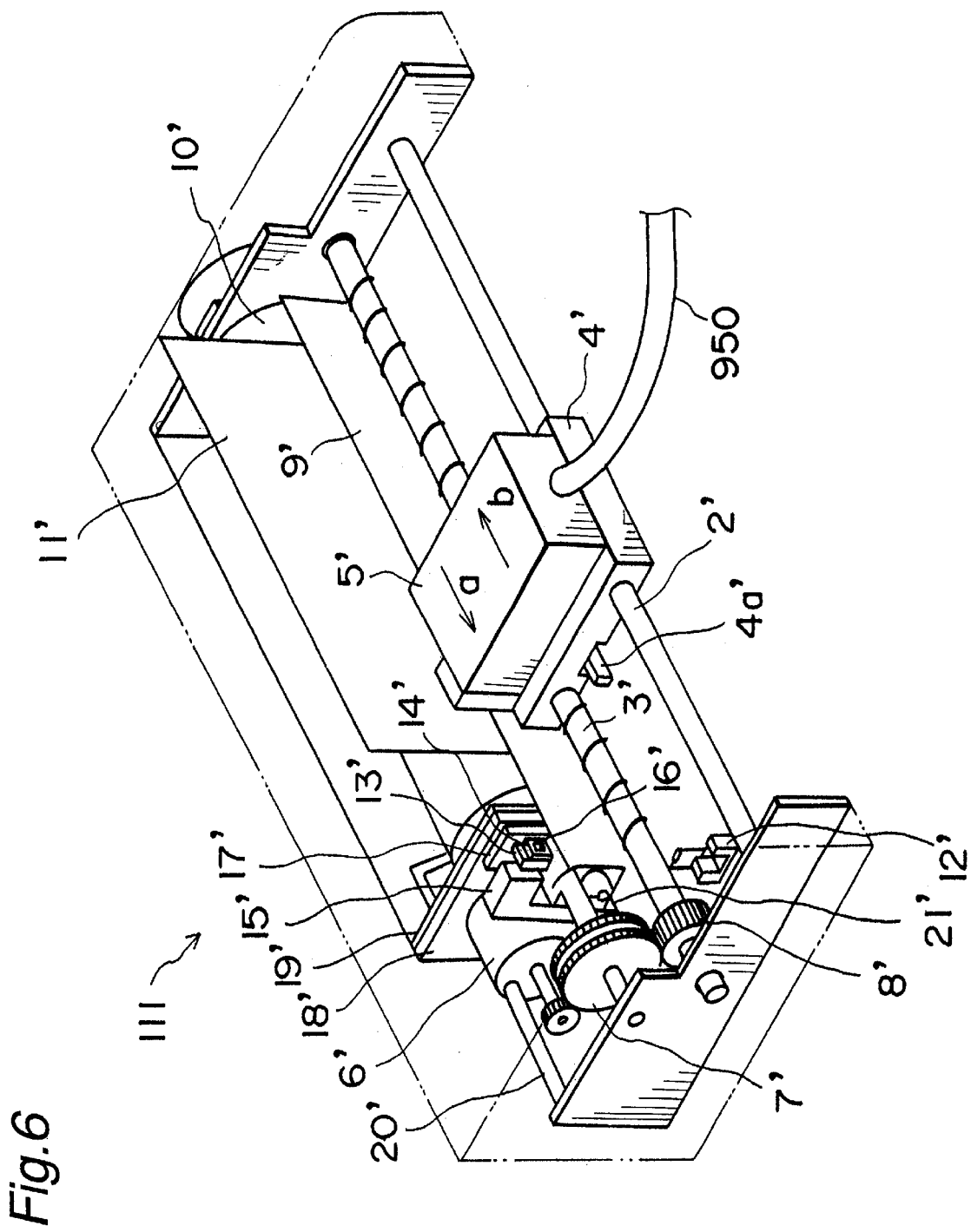
FIG. 6 is an aslant view of a printing mechanism inside a printer unit part of the digital camera of FIG. 2.

Next, referring to FIG. 6, it is explained about the printing part 111 of the printer unit part 2 of the digital camera.

That is, there are provided a guide rod 2' and a lead screw 3' which extend parallel to each other in a lower location inside a housing of the camera body 1. Between the guide rod 2' and the lead screw 3', the recording head 5' (also refer to FIG. 5) constituted by an ink jet head cartridge is movably supported by a carriage 4'. The recording head 5' has a head of four colors of Y, M, C and K, with which it is possible to print a full-color image. As aforementioned, the recording head 5' is supplied with the ink from the ink cartridge 903 through the ink supply tube 950. The lead screw 3' engages with a reversible drive motor 6' via a plurality of gears 7' and 8'. By forwardly and reversely rotating the lead screw 3' which is driven to be rotated by the drive motor 6', the carriage 4', i.e. the recording head 5', can be moved along the guide rod 2' in both directions shown by arrows of "a" and "b" in the figure.

Behind the lead screw 3', a sheet pressing plate 9' and a roll-shaped platen 10' are provided. In the arrangement, a printing sheet 11' of paper is fed with a state with which the printing sheet 11' thereof is pressed against the roll-shaped platen 10' by the sheet pressing plate 9'.

As shown in the figure, the cartridge 4' has a lever 4a' which projects sideways from a body of the cartridge 4'. On the other hand, there is installed a detector 12', constituted by a photo-coupler, on the camera body 1 at a location corresponding to a home position of the cartridge 4' relative to the camera body 1. With this arrangement, when the detector 12' detects the lever 4a', the direction of rotation of the drive motor 6' is controlled.

A reference numeral 13' points to a support member for supporting a cap member 14' which caps a front surface of a recording head (not shown in the figure).

A reference numeral 15' points to a suction device for sucking an inside of the cap member 14'. The suction device 15' recovers the suction of the recording head 5' through an opening 16' provided inside the cap member 14'.

A reference numeral 17' points to a cleaning blade, and a reference numeral 18' points to a member of forward and backward movement which enables the cleaning blade 17' to move back and forth. The member 18' of forward and backward movement is supported by a main body support plate 19'.

A reference numeral 20' points to a lever for starting the suction for its suction recovery. The lever 20' is moved in accordance with movement of a cam 21' which engages the cartridge 4'. In the arrangement, the movement of the lever 20' is controlled by switching a drive power from the drive motor 6' by a conventional switching means such as a clutch.

According to the first embodiment, when the cartridge 4' locates within a region of a side of the home position, on the basis of the operation of the lead screw 3, its predetermined capping operation is carried out by the cap member 14', the predetermined cleaning operation is carried out by the cleaning blade 17', and the predetermined suction recovery operation is carried out by the lever 20'.

However, the timing to carry out these predetermined operations is not limited to the timing employed in this embodiment. As a modification, the timing, for example, can be any conventional one with which the predetermined operations are performed.

Also, according to the first embodiment, as the ink jet printer, a conventional printing system employing a piezo-electric element is adopted.

However, the printing system is not limited to the one in this embodiment. As a modification, as the ink jet printer, the printing system, for example, can be of a type of bubble jet system employing an electrothermal transducer.

On the other hand, the arrangement of the CCD 101, the ink cartridge 903, or the like, is not limited to the one in this first embodiment. Next, referring to FIGS. 7 through 9, it is explained about a modification to the first embodiment.

Figure 7:
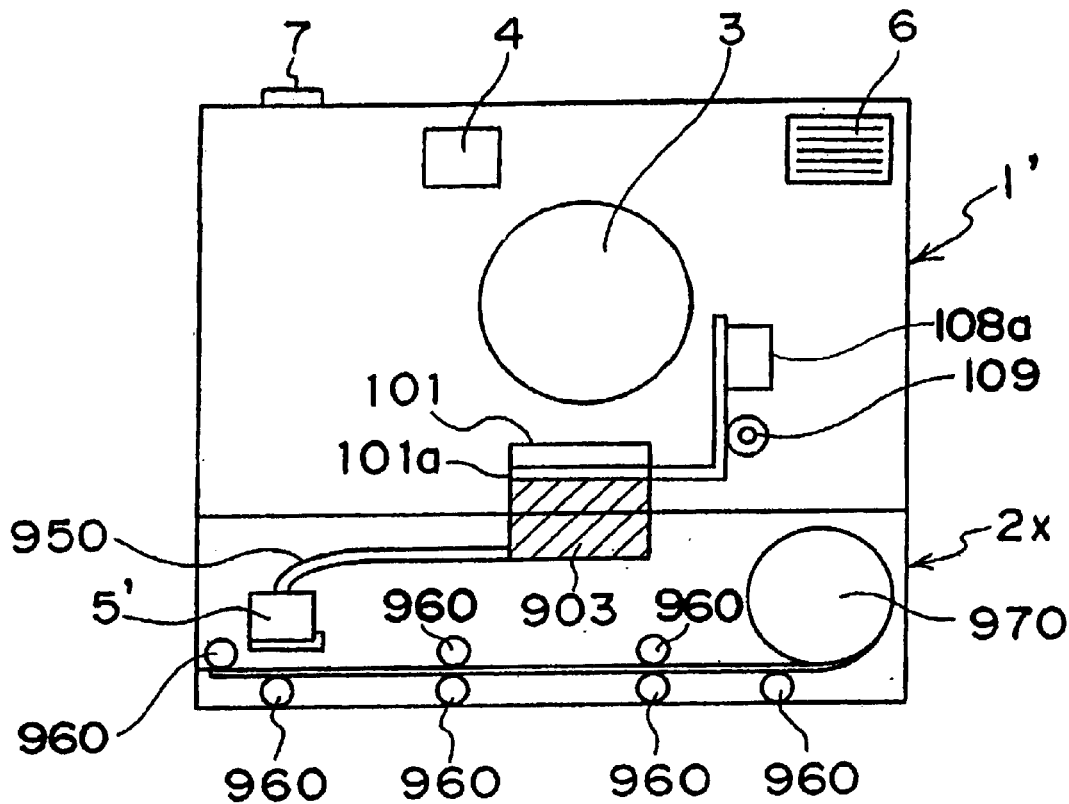
FIG. 7 is a perspective explanatory view of the digital camera according to a modification to the digital camera shown in FIG. 2.

That is, according to the modification thereto, the CCD 101, the ink cartridge 903, and so on, are arranged on a bottom side of the camera body 1', as shown in FIG. 7.

In more detail, as shown in the same figure, the digital camera is composed of two parts: the camera body 11 and a printer unit 2X which is removably attached to a bottom part of the camera body 1', unlike the first embodiment according to which the camera body 1 includes the printer unit part 2. In the arrangement, the CCD 101 is arranged on a bottom side of the camera body 1' with a state with which the CCD 101 is provided on top of the ink cartridge 903 via the substrate 101a, and with which a surface of the CCD 101 is faced upwards and is horizontal.

More specifically, the ink cartridge 903 has an upper portion which projects upwards from the printer unit 2x. When the printer unit 2x is attached to the camera body 1' by inserting the printer unit 2x to the bottom part of the camera body 1' from below, a top surface of the ink cartridge 903 is arranged on a rear surface of the substrate 101a, on a top surface of which there is mounted the CCD 101.

In the arrangement, heat generated from the CCD 101 is transmitted to the ink cartridge 903 via the substrate 101a.

Further, on a part of the substrate 101a, there is also installed a drive circuit 108a for supplying an electric power to the flash device 6, with a state with which the drive circuit 108a is supported by the substrate 101a. In this arrangement, heat generated from any capacitor and a booster provided inside the drive circuit 108a is also transmitted to the ink cartridge 903 through the substrate 101a.

By the way, in order not to let the substrate 101a be exposed outside when the printer unit 2x is detached from the camera body 1', there is mounted an opening/closing cover (not shown) on a side of the bottom of the camera body 1'.

Figure 8:
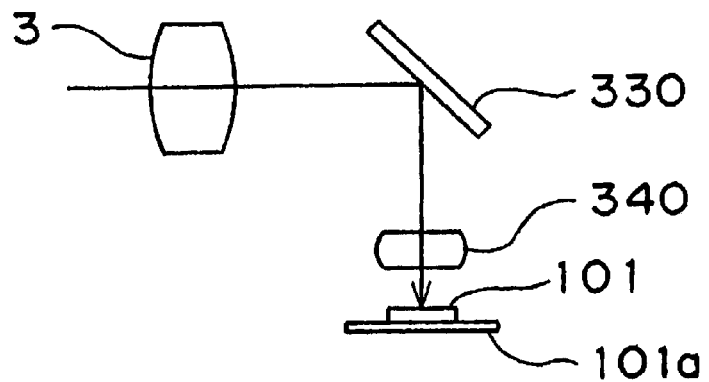
FIG. 8 is an explanatory view showing an optical system employed in the digital camera of FIG. 7.

FIG. 8 is an explanatory view showing an optical system of the digital camera shown in FIG. 7. As shown therein, in order to focus the image of an object to be photographed onto the top surface of the CCD 101 provided on the bottom part of the camera body 1', there is mounted a reflector 330 for bending its optical path and a condenser lens 340 inside the camera body 1', in addition to installment of the photographing lens 3.

As shown in FIG. 7, inside one side of the printer unit 2X, a paper roll (or a sheet roll of paper) 970 is accommodated; and inside the other side thereof, the printer head 5' is installed. In the arrangement, a sheet of paper unwound from the paper roll 970 is fed towards the printer head 5' for printing the sheet thereof, by a plurality of paper feeding rollers 960. The printer head 5' is supplied with ink from the ink cartridge 903 through the ink supply tube 950.

Figure 9:
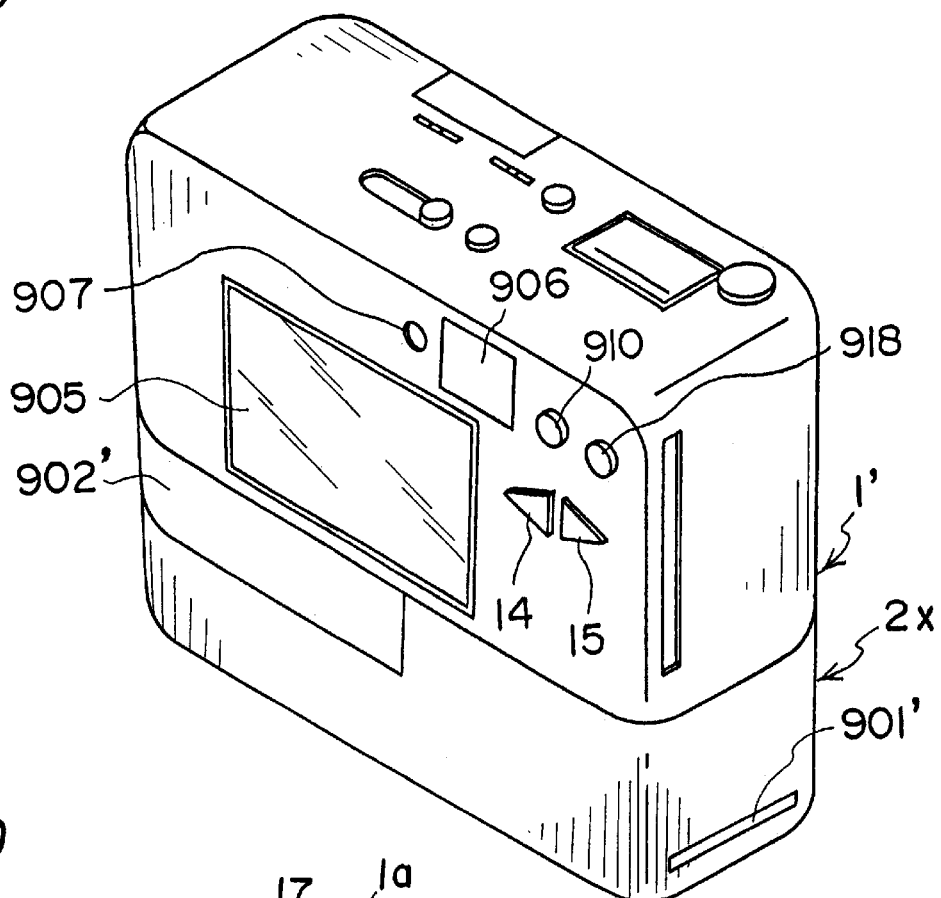
FIG. 9 is an aslant rear view of the digital camera of FIG. 7.

The sheet of paper, having been printed by the printer head 5', is cut by a cutter (not shown), and the sheet thereof thus cut is discharged through a discharge outlet 901' which is formed on one side wall of the printer unit 2x, as shown in FIG. 9.

As shown in FIG. 9, the printer unit 2x has a lid 902' which can be opened and closed. By opening the lid 902', it is possible to replace the ink cartridge 903 with another, and/or to replace the sheet roll 970 with another, while the printer unit 2x is kept to be attached to the camera body 1'.

Second, referring to FIGS. 10 through 16, the description is made below on the digital camera unified with the printer according to the second embodiment of the present invention.

The digital camera of the second embodiment is similar in basic construction to the digital camera of the first embodiment. Therefore, mainly focussing the difference(s) in contrast with the first embodiment, it is explained about the digital camera of the second embodiment.

Figure 10:
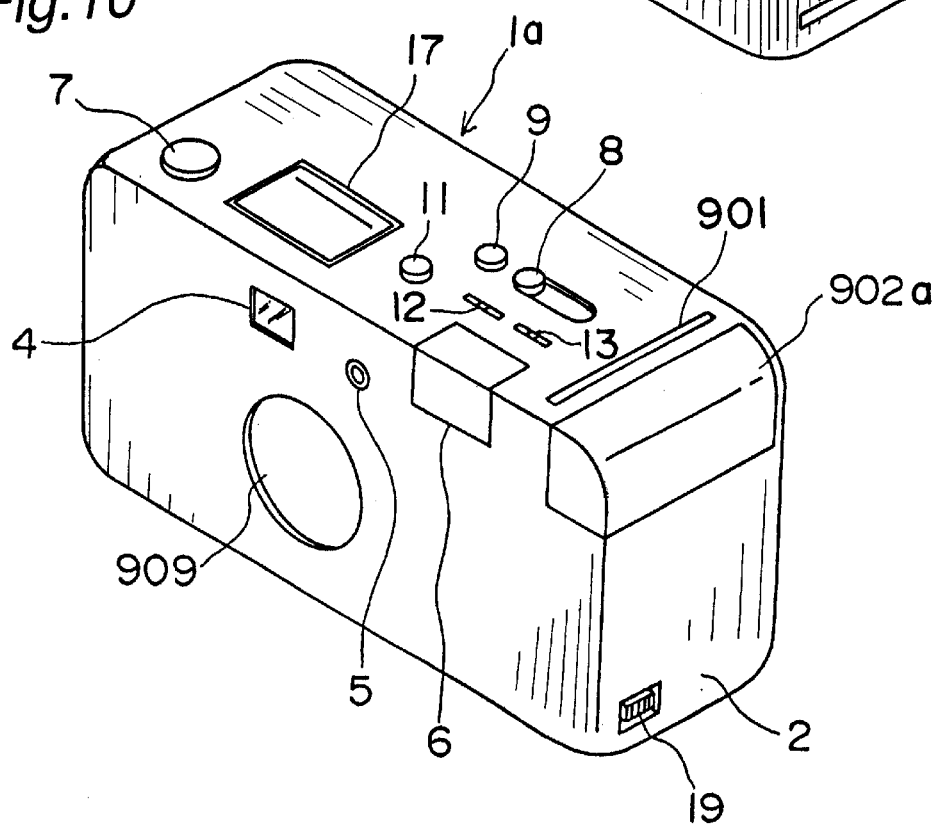
FIG. 10 is an aslant front view of the digital camera unified with the printer according to a second embodiment of the present invention.
Figure 11:
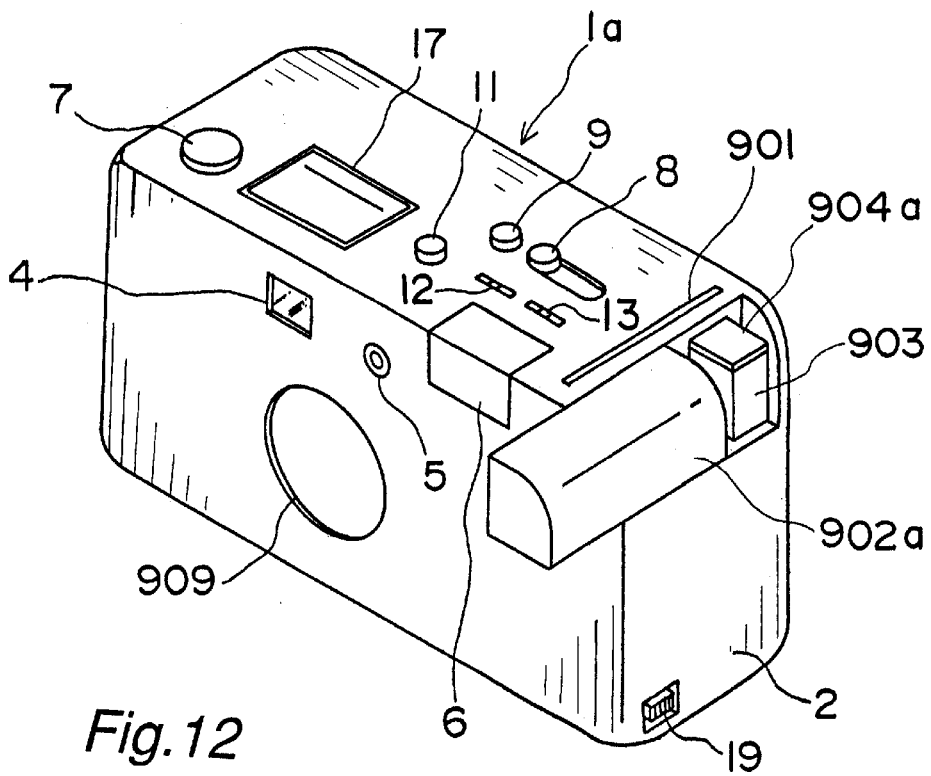
FIG. 11 is an aslant front view similar to FIG. 10, in which a slider for opening/closing a chamber to accommode an ink cartridge is opened.
Figure 12:
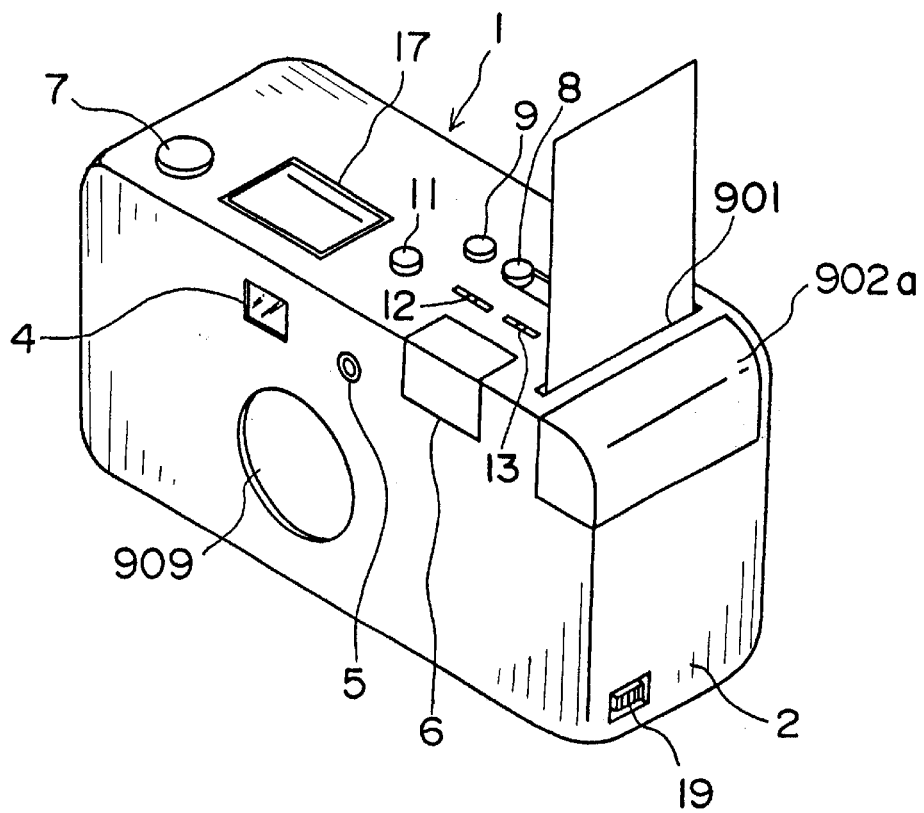
FIG. 12 is an aslant front view similar to FIG. 10, in which a printed sheet of paper is discharged through a slot.
Figure 13:
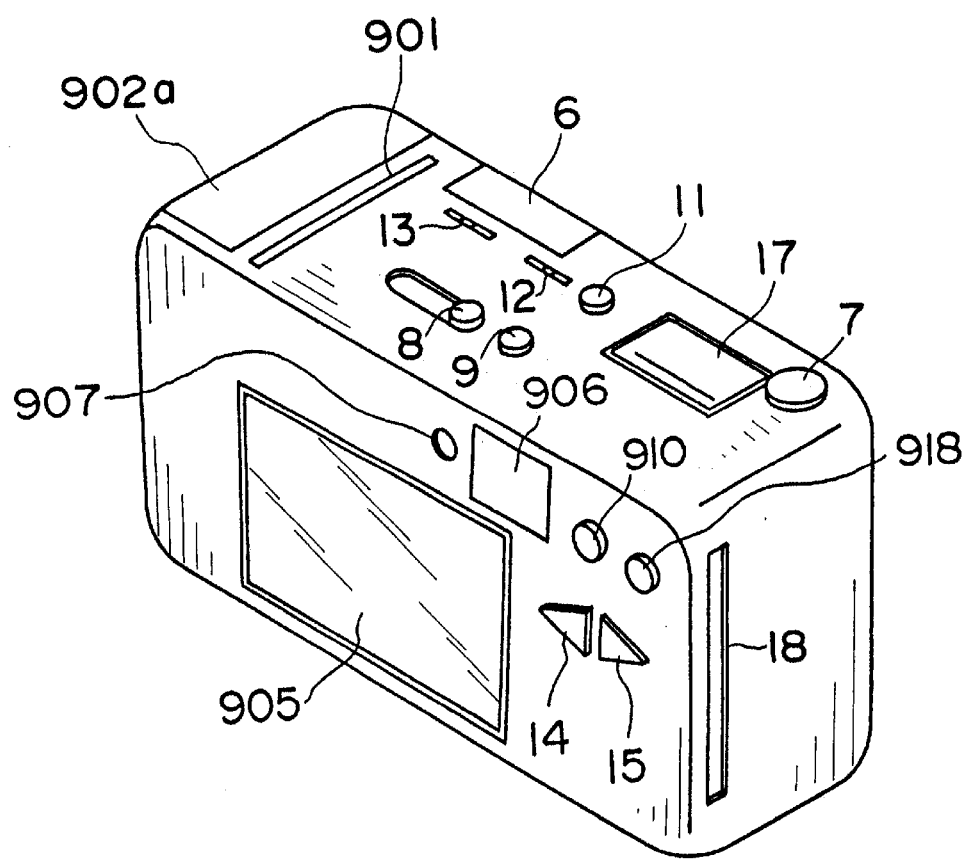
FIG. 13 is an aslant rear view of the digital camera of FIG. 10.
Figure 14:
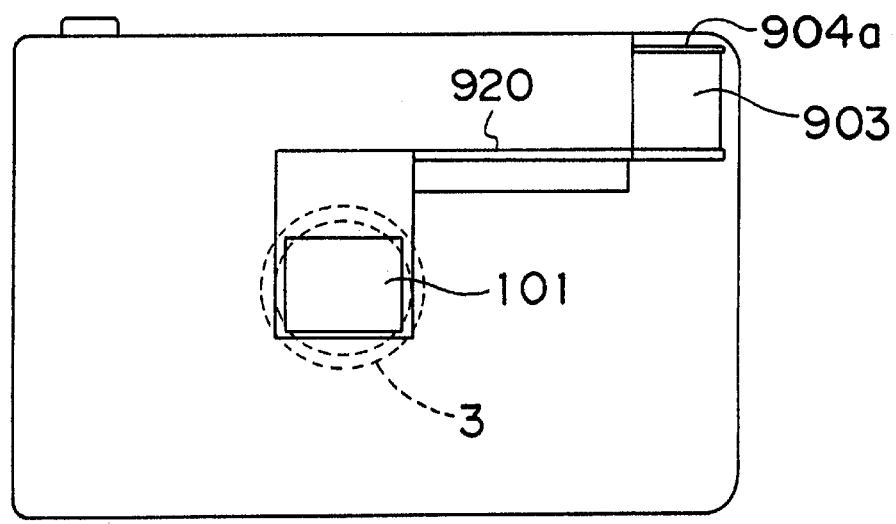
FIG. 14 is a perspective front view of the digital camera of FIG. 10.

Each of FIGS. 10 through 12 is an aslant front view of the digital camera thereof; FIG. 13 is an aslant rear view thereof; FIG. 14 is a front perspective view thereof; and FIG. 15 is a side perspective view thereof.

As shown in FIG. 10, on an upper surface (or top wall) of the camera body 1a, a slider 902a is provided adjacent to a printed sheet discharging outlet 901. And as shown in FIG. 11, an ink cartridge 903 is accommodated in a space able to be covered by the slider 902a, and the slider 902a is slidably attached to the camera body 1a. In the arrangement, as shown in the same figure, when the slider 902a is slid to open the space, it is possible to replace the ink cartridge 903 with another.

The lid 904a can be removed upwards relative to the ink cartridge 903. When the lid 904a is thus removed upwards, it is possible to take the ink cartridge 903 out sideways, by using finger(s), with respect to the camera body 1a.

Figure 15:
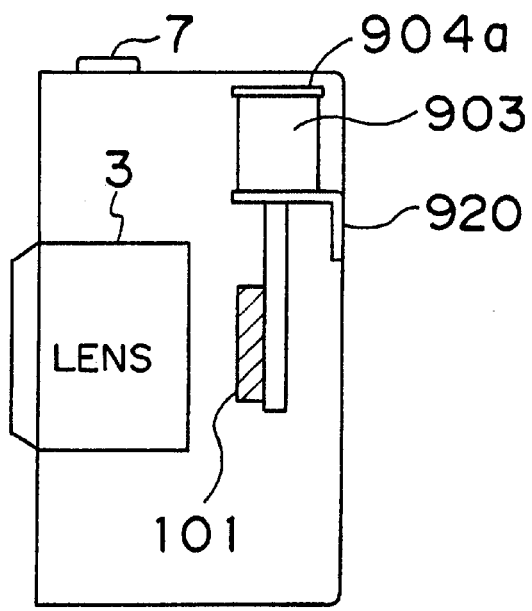
FIG. 15 is a perspective side view of the digital camera of FIG. 10.

According to the second embodiment, different from the first embodiment, the ink cartridge 903 is arranged in a position away from the CCD 101, as shown in FIGS. 14 and 15.

Figure 16:
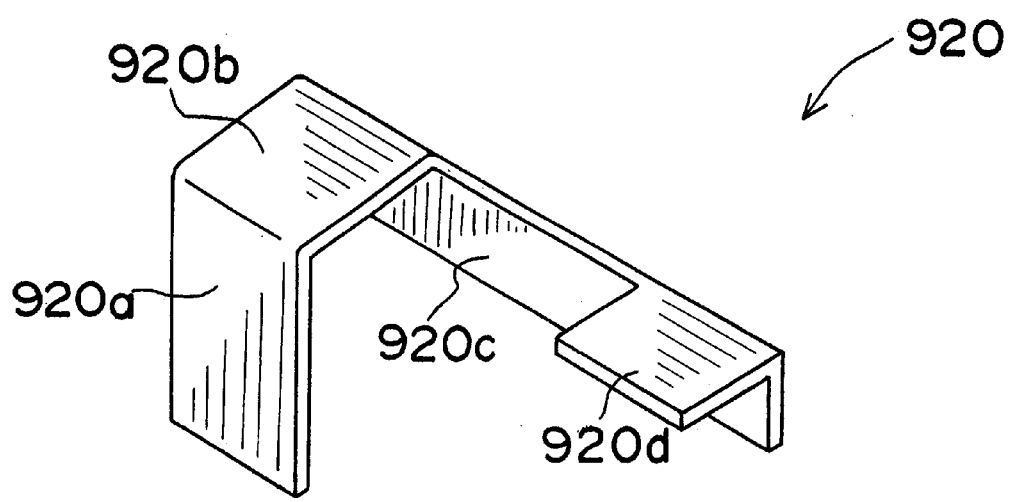
FIG. 16 is an aslant enlarged view of a heat radiation plate to transmit heat to the ink cartridge of the digital camera of FIG. 10.
Figure 17:
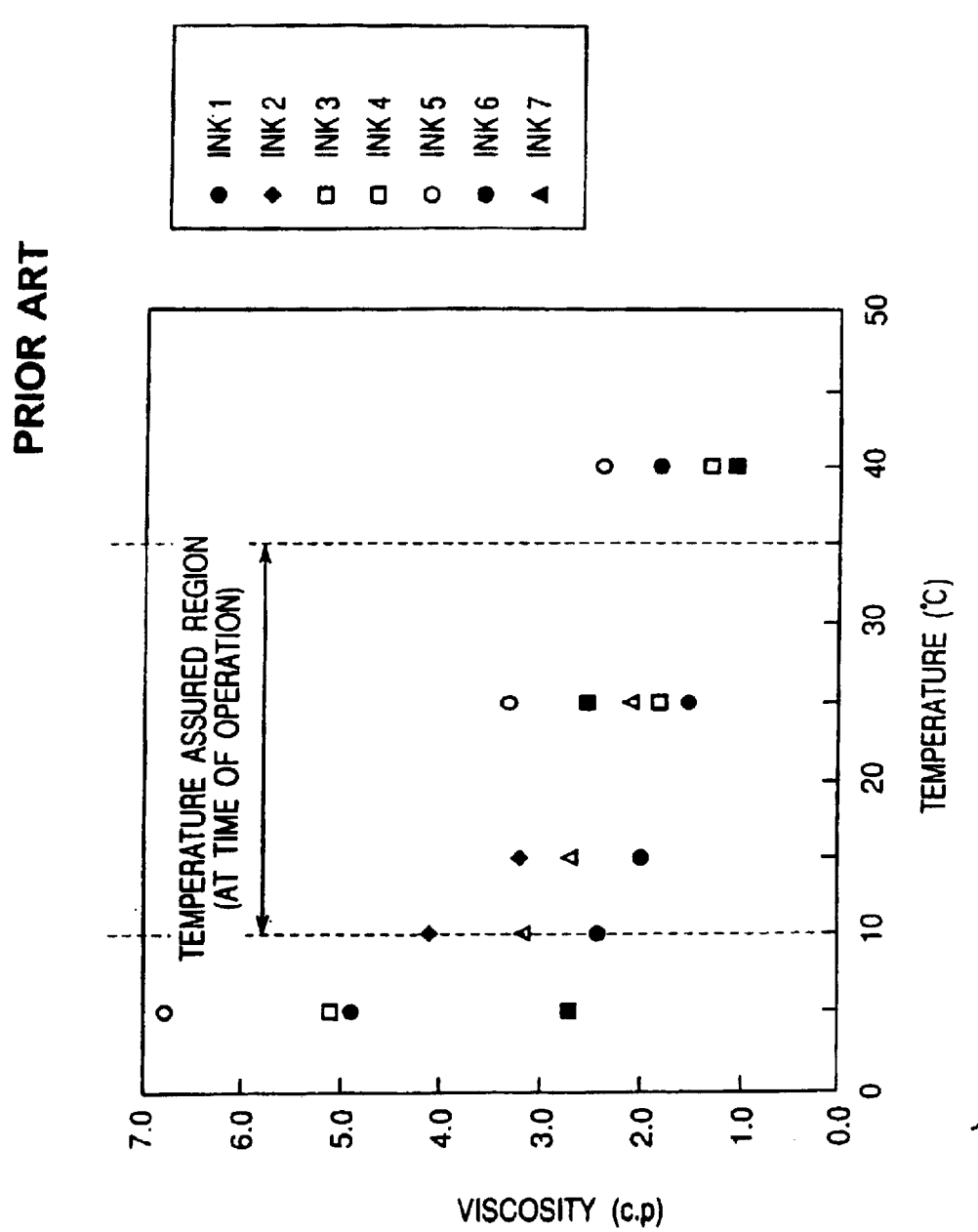
FIG. 17 is a graph showing a relation between temperature of ink and viscosity thereof.
Figure 18:
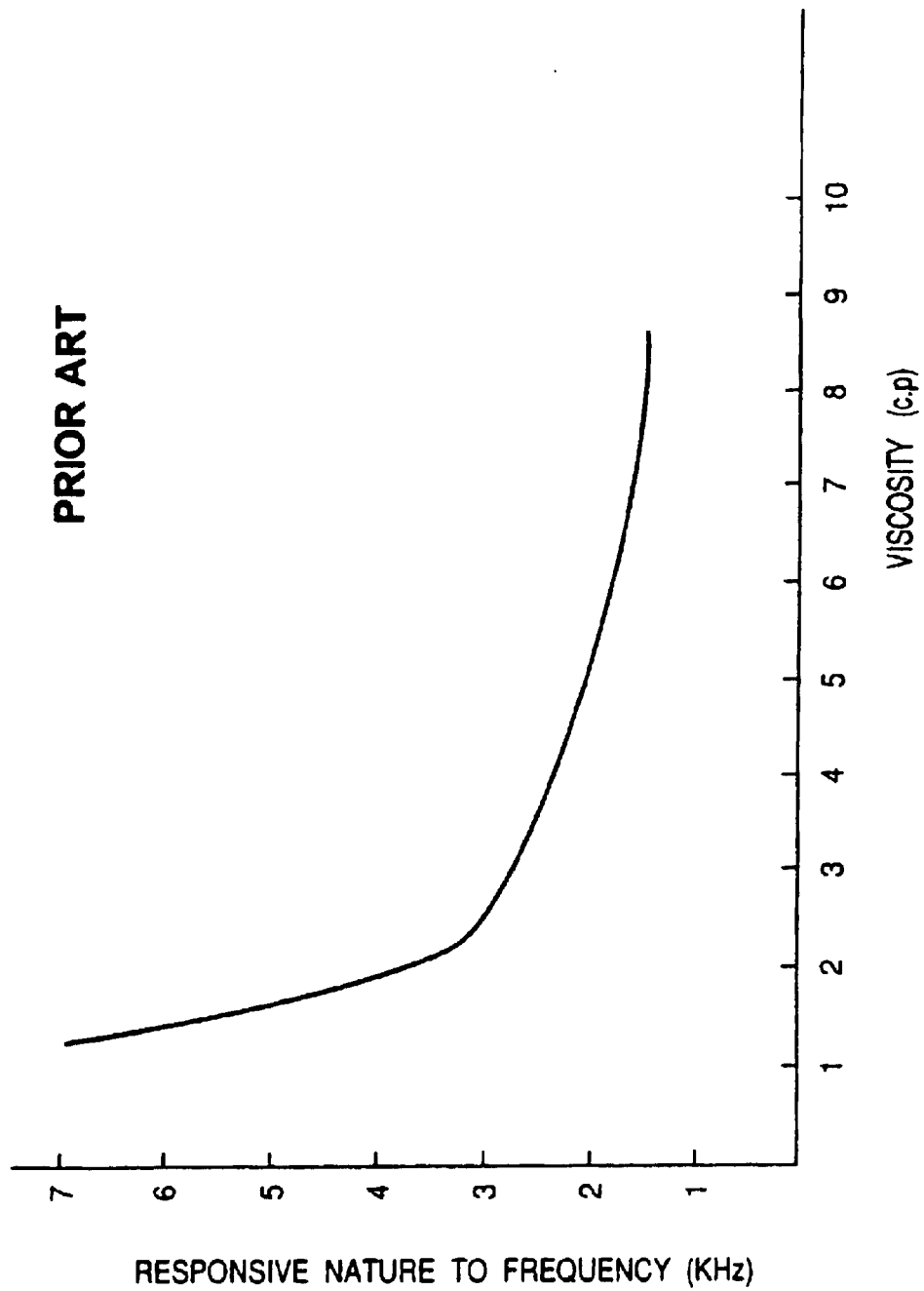
FIG. 18 is a graph showing a relation between viscosity of ink and responsive nature to frequency.

Between the CCD 101 arranged at a central part of the camera body 1a, and the ink cartridge 903 arranged on an upper side part of the camera body 1a, there is provided a heat radiation plate (heat discharging board) 920, non-flat in shape as shown in FIG. 16, which is bridged therebetween.

The heat radiation plate 920 is made of a material having high heat conductivity (high thermal conductivity). This heat radiation plate 920 is, for example, made of an aluminum plate, or a heat sink material which is employed for a notebook-type personal computer, or the like.

As shown in FIG. 16, the heat radiation plate 920 is composed of:

a first segment 920a that is generally vertical relative to the camera body 1a;

a second segment 920b one end of which is connected to an upper edge of the first segment 920a so that the second segment 920b is generally perpendicular to the first segment 920a (i.e. the second segment 920b is generally horizontal relative to the camera body 1a);

a third segment 920c that is connected to the other end of the second segment 920b at an edge part of the third segment 920c so that the third segment 920c is generally perpendicular to the second segment 920b (i.e. the third segment 920c is generally vertical relative to the camera body 1a) in which the first segment 920a, the second segment 920b and the third segment 920c cooperate to form bracket-shaped; and a fourth segment 920*d* that is connected to the edge part, opposite to the edge part to which the second segment 920*b* is connected in a direction in which the third segment 920*c* extends, of the third segment 920*c* and that projects on the same side as the second segment 920*b* so that the fourth segment 920*d* is generally perpendicular to the third segment 920*c* and so that the fourth segment 920*d* is included generally in one single imaginary plane including the second segment 920*b*.

As shown in FIGS. 14 and 15, the CCD 101 is mounted on the first segment 920*a* of the heat radiation plate 920; on the other hand, the ink cartridge 903 is mounted on the fourth segment 920*d* with a state with which a bottom of the ink cartridge 903 contacts a top surface of the fourth segment 920*d*.

In this arrangement, most of the heat generated from the CCD 101 is absorbed by the heat radiation plate 920 with the high heat conductivity, and the heat is efficiently conducted to the ink cartridge 903.

According to the digital camera unified with the printer according to the second embodiment, the heat generated by the CCD 101 is transmitted to the ink cartridge 903 via the heat radiation plate 920. With this transmission of the heat, the ink stored inside the ink cartridge 903 is efficiently prevented from dropping down in temperature, and the temperature of the ink is sure to be kept within a predetermined thermal region within which the printing operation is assured to be carried out and within which a good printing quality is maintained.

The following are the tables (TABLE 1 through TABLE 6) showing some examples of inks with different compositions, which can be suitably employed for the digital camera according to each of the first and second embodiments. Actually, for example, some of the inks shown in the tables can be appropriately combined to each other therefor.

TABLE 1

NORMAL C INK

Composition Ratio (w %)

| | | |
|---|---|---|
| Solvent | Water | 75.0 |
| | Polyhydric Alcohol/DEG | 11.2 |
| | Polyhydric Alcohol Ether/TGB | 6.5 |
| | Thickener/PEG #400 | 3.5 |
| Coloring Material | Dye/Bayer CY-BG | 3.0 |
| Additive | Surface Active Agent/Olfin E 1010 | 0.8 |
| | ph Conditioner/NaHCO$_3$ | 0.2 |

TABLE 2

NORMAL K INK

Composition Ratio (w %)

| | | |
|---|---|---|
| Solvent | Water | 78.9 |
| | Polyhydric Alcohol/DEG | 6.0 |
| | Polyhydric Alcohol Ether/TGB | 6.0 |
| | Thickener/PEG #400 | 3.5 |
| Coloring Material | Dye/Bayer BK-SP | 4.6 |
| Additive | Surface Active Agent/Olfin E 1010 | 0.8 |
| | ph Conditioner/NaHCO$_3$ | 0.2 |

TABLE 3

PHOTO Y INK

Composition Ratio (w %)

| | | |
|---|---|---|
| Solvent | Water | 77.9 |
| | Polyhydric Alcohol/DEG | 11.0 |
| | Polyhydric Alcohol Ether/TGB | 6.5 |
| | Thickener/PEG #400 | 3.0 |
| Coloring Material | Dye/Bayer Y-CA 51092 | 0.6 |
| Additive | Surface Active Agent/Olfin E 1010 | 0.8 |
| | ph Conditioner/NaHCO$_3$ | 0.2 |

TABLE 4

PHOTO M INK

Composition Ratio (w %)

| | | |
|---|---|---|
| Solvent | Water | 77.4 |
| | Polyhydric Alcohol/DEG | 11.0 |
| | Polyhydric Alcohol Ether/TGB | 6.5 |
| | Thickener/PEG #400 | 3.5 |
| Coloring Material | Dye/BASF RED FF-3282 | 0.6 |
| Additive | Surface Active Agent/Olfin E 1010 | 0.8 |
| | ph Conditioner/NaHCO$_3$ | 0.2 |

TABLE 5

PHOTO C INK

Composition Ratio (w %)

| | | |
|---|---|---|
| Solvent | Water | 77.4 |
| | Polyhydric Alcohol/DEG | 11.0 |
| | Polyhydric Alcohol Ether/TGB | 6.5 |
| | Thickener/PEG #400 | 3.5 |
| Coloring Material | Dye/Bayer CY-BG | 0.7 |
| Additive | Surface Active Agent/Olfin E 1010 | 0.8 |
| | ph Conditioner/NaHCO$_3$ | 0.2 |

TABLE 6

PHOTO K INK

Composition Ratio (w %)

| | | |
|---|---|---|
| Solvent | Water | 82.3 |
| | Polyhydric Alcohol/DEG | 6.0 |
| | Polyhydric Alcohol Ether/TGB | 6.0 |
| | Thickener/PEG #400 | 3.5 |
| Coloring Material | Dye/Bayer BK-SP | 1.2 |
| Additive | Surface Active Agent/Olfin E 1010 | 0.8 |
| | ph Conditioner/NaHCO$_3$ | 0.2 |

Although the present invention has been fully described in connection with the preferred embodiments thereof with reference to the accompanying drawings, it is to be noted that various other changes and modifications are also apparent to those skilled in the art.

For example, instead of the arrangement employing the aforementioned CCD, it is possible to employ any arrangement in which heat generated from a back light for an image display LCD is employed.

Also, for example, instead of the arrangement in which the heat is transmitted to the ink cartridge, it is possible to employ any arrangement in which the heat is transmitted to an ink supply passage like the ink supply tube.

Such changes and modifications are also to be understood as included within the scope of the present invention as defined by the appended claims unless they depart therefrom.

What is claimed is:

1. A digital camera comprising:
   a member which generates heat at time of executing a photographing operation;
   a printing part for printing an image on a basis of data upon the image which is taken at time of executing the photographing operation;
   an ink cartridge for supplying an ink to the printing part; and
   an ink supply passage which is connected to the ink cartridge and the printing part to supply the ink from the ink cartridge to the printing part,
   wherein the ink cartridge adjoins the member and heat generated from the member is directly transmitted to the ink cartridge.

2. The digital camera as claimed in claim 1, wherein the member is an image-taking element.

3. The digital camera as claimed in claim 2,
   wherein the ink cartridge is removably mounted on a rear side of the image-taking element.

4. The digital camera as claimed in claim 1, wherein the member is a monitor for displaying the image which is taken at time of executing the photographing operation.

5. The digital camera as claimed in claim 4, wherein the monitor comprises:
   a liquid crystal display part; and
   a lighting device for lighting the liquid crystal display part from behind.

6. The digital camera as claimed in claim 1, wherein the member is a battery.

7. A digital camera comprising:
   a member which generates heat at time of executing a photographing operation;
   a printing part for printing an image on a basis of data upon the image which is taken at time of executing the photographing operation; and
   a supplier for supplying an ink to the printing part, wherein the supplier adjoins the member,
   wherein the member is an electric circuit for driving a flash device.

8. A digital camera comprising:
   a first member which generates heat at time of executing a photographing operation;
   a printing part for printing an image on a basis of data upon the image which is taken at time of executing the photographing operation;
   a supplier for supplying an ink to the printing part; and
   a second member for conducting the heat from the first member to the supplier, said second member having a non-flat shape.

9. The digital camera as claimed in claim 8, wherein the supplier comprises:
   an ink cartridge; and
   an ink supply passage which is connected to the ink cartridge.

10. The digital camera as claimed in claim 8, wherein the first member is an image-taking element.

11. The digital camera as claimed in claim 10, wherein the supplier comprises:
    an ink cartridge; and
    an ink supply passage which is connected to the ink cartridge,
    wherein the ink cartridge is provided on a side of a rear surface of the image-taking element via the second member.

12. The digital camera as claimed in claim 8, wherein the first member is a monitor.

13. The digital camera as claimed in claim 12, wherein the monitor comprises:
    a liquid crystal display part; and
    a lighting device for lighting the liquid crystal display part from behind.

14. The digital camera as claimed in claim 8, wherein the first member is a battery.

15. The digital camera comprising:
    a first member which generates heat at time of executing a photographing operation;
    a printing part for printing an image on a basis of data upon the image which is taken at time of executing the photographing operation;
    a supplier for supplying an ink to the printing part; and
    a second member for conducting the heat from the first member to the supplier, wherein the first member comprises an electric circuit for driving a flash device.

16. The digital camera as claimed in claim 8, wherein the second member is a thermal conduction member.

17. The digital camera as claimed in claim 1, wherein
    the second member is a thermal conduction substrate having at least first surface and second a second surface, normal to the first surface, and the image-taking element is mounted on one of the first and second surfaces while the ink cartridge is mounted on the other of the first and second surfaces.

18. The digital camera as claimed in claim 17, which further comprises a third member which generates heat at time of executing the photographing operation, wherein the third member is mounted on the substrate.

19. The digital camera as claimed in claim 18, wherein the third member comprises a drive circuit for supplying electric power to a flash device.

20. A digital camera comprising:
    a member which generates heat at time of executing a photographing operation;
    a printing part for printing an image on a basis of data upon the image which is taken at time of executing the photographing operation; and
    an ink cartridge for supplying an ink to the printing part, wherein the ink cartridge is removably mounted on the member and heat generated from the member is transmitted to the ink cartridge.

* * * * *